(No Model.) 2 Sheets—Sheet 1.

C. F. LAWRENCE & M. RUECKERT.
GRAIN DRILL.

No. 407,359. Patented July 23, 1889.

WITNESSES
S. L. Schraden
J. H. Carnsby

INVENTOR
Charles F. Lawrence &
Michael Rueckert by
Paul Bakewell their atty.

(No Model.) 2 Sheets—Sheet 2.

C. F. LAWRENCE & M. RUECKERT.
GRAIN DRILL.

No. 407,359. Patented July 23, 1889.

WITNESSES
T. L. Schrader

INVENTOR
Charles F. Lawrence &
Michael Rueckert by
Paul Bakewell
their att'y.

UNITED STATES PATENT OFFICE.

CHARLES F. LAWRENCE, OF LITHIUM, AND MICHAEL RUECKERT, OF ST. MARY'S, MISSOURI.

GRAIN-DRILL.

SPECIFICATION forming part of Letters Patent No. 407,359, dated July 23, 1889.

Application filed March 23, 1889. Serial No. 304,535. (No model.)

*To all whom it may concern:*

Be it known that we, CHARLES F. LAWRENCE, a citizen of the United States, residing at Lithium, in the county of Perry, State of Missouri, and MICHAEL RUECKERT, a citizen of the United States, residing at St. Mary's, in the county of St. Genevieve, State of Missouri, have invented certain new and useful Improvements in Grain-Drills, of which the following is a full, clear and exact description.

Our invention relates to improvements in grain-drills, and has for its object to disseminate the grain more uniformly along the ground and thereby obtain a larger yield therefrom than at present.

It consists in a contrivance whereby, on the forward motion of the grain-drill, a transverse vibratory movement is imparted to the drill-teeth, which causes the grain to be deposited on the ground in undulating or zigzag lines, instead of straight, as heretofore, combined with other features of novelty, as hereinafter claimed.

Figure 1:
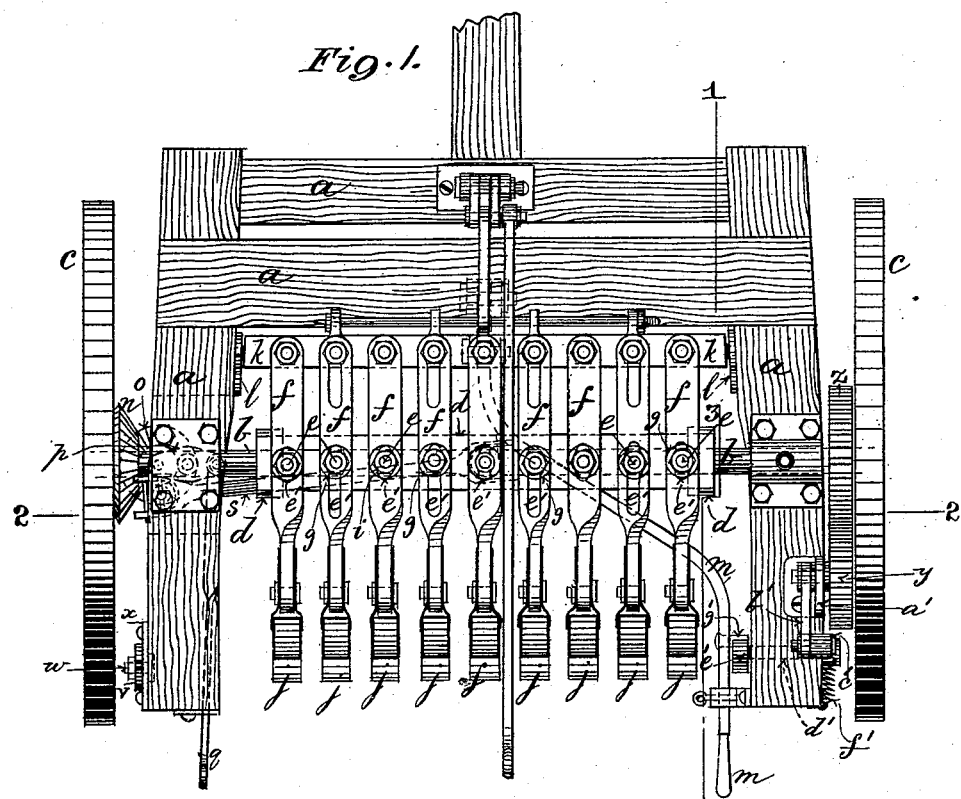
Figure 2:
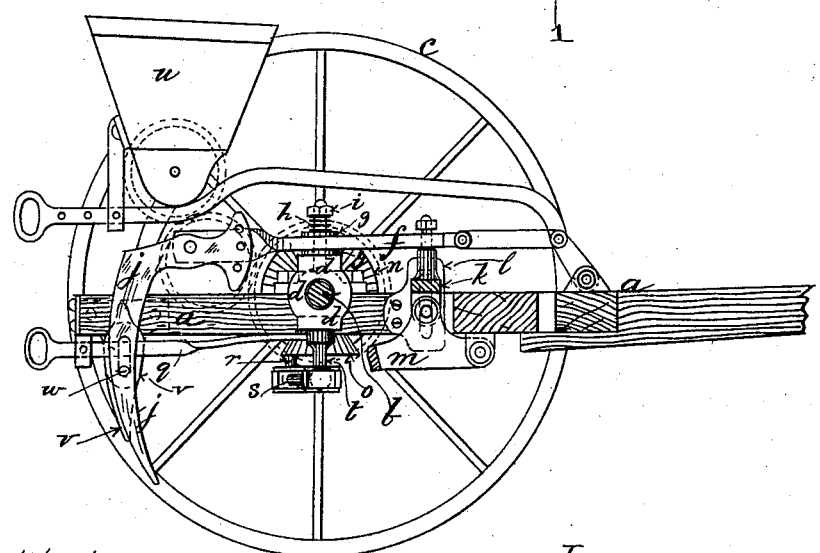
Figure 3:
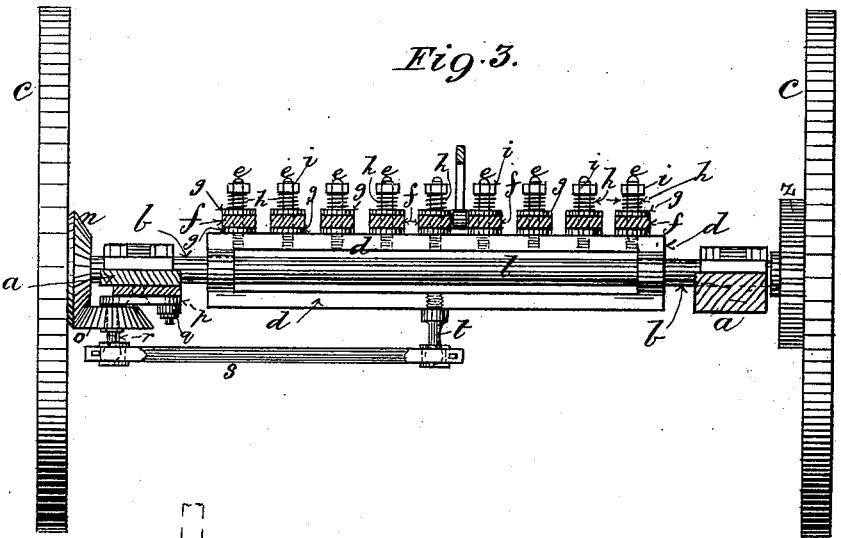
Figure 4:
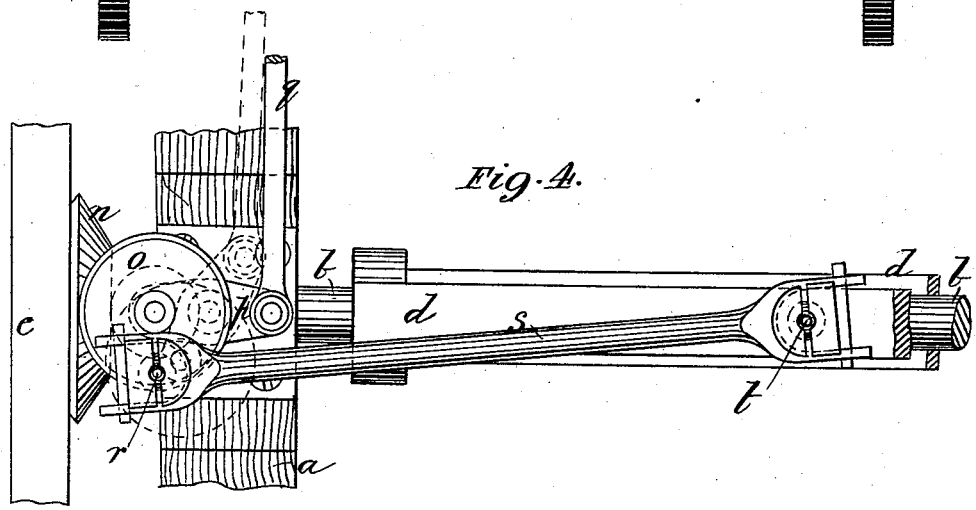

On the accompanying drawings, Figure 1 represents a plan of our improved grain-drill, omitting the hopper and its appendages; Fig. 2, a longitudinal sectional elevation thereof on line 1 1 in Fig. 1, partly broken away for clearness of illustration; Fig. 3, a transverse sectional elevation on line 2 2 in Fig. 1; Fig. 4, an inverted plan of the mechanism comprising part of our invention adjacent to the axle, as seen to the left of Fig. 1, and Fig. 5 an inside longitudinal view on line 3 3 in Fig. 1, broken away, showing the device for engaging and releasing the hopper feed-gears, like letters of reference denoting like parts in all the figures.

$a$ represents the carriage-frame, $b$ the axle, and $c$ the drive-wheels of a grain-drill, as usually arranged. Around the axle $b$ and adapted to slide longitudinally thereon between the side bars of the frame $a$ is fitted a sleeve $d$ of suitable length, having on its upper side pins $e$, which project vertically through slots $e'$ in the bars $f$. Around the pins $e$, above and below the bars $f$, are preferably placed washers $g$ which, with the bars $f$, are maintained in contact with the sleeve $d$ by spiral springs $h$, located between the upper washers $g$ and nuts $i$ on the upper ends of the pins $e$. The bars $f$ carry at their rear ends the drill-teeth $j$, and are pivoted at their front ends to the horizontal transverse bar $k$, which is adjustable vertically in end guides $l$ by the hand-lever $m$, extending to the rear of the carriage for raising and lowering the drill-teeth, in the usual manner.

On the axle $b$, adjacent to one of the drill-wheels $c$, is fixed a bevel-wheel $n$, with which is caused to engage a bevel wheel or pinion $o$, pivoted axially to one arm of a lever $p$, (seen particularly in Figs. 3 and 4,) which is arranged horizontally and fulcrumed to the under side of the frame $a$, the other arm of the lever $p$ being coupled to a hand-rod $q$, which extends rearward beneath the carriage within reach of the operator. On the lower side or back of the bevel-wheel $o$ is fixed a crank-pin $r$, which is coupled by a rod $s$ to a pin $t$, fixed to the under side of the sleeve $d$. By this arrangment, on pushing inward the hand-rod $q$ and so moving the lever $p$ about its fulcrum into the position seen in Figs. 1, 3, and 4, the bevel wheel or pinion $o$ is thrown into gear with the bevel-wheel $n$, whereby, on the forward motion of the grain-drill, the sleeve $d$ is reciprocated along the axle $b$, and the bars $f$, with the drill-teeth $j$, vibrated to a corresponding extent about their fulcrums on the front bar $k$, so that the grain as it passes from the hopper $u$ is deposited by the drill-teeth $j$ zigzagwise or in undulating lines along the ground. On pulling the hand-rod $q$ the lever $p$ is reversed on its fulcrum and the bevel-wheel $o$ thrown out of engagement with the bevel-wheel $n$, as shown by dotted lines in Fig. 4, thereby stopping the reciprocation of the sleeve $d$, for enabling the grain to be deposited by the drill-teeth $j$ in straight lines or for purpose of transportation, as desired.

By the action of the spiral springs $h$ on the pins $e$ the bars $f$ are enabled to rise when stones or other obstructions are encountered by the drill-teeth $j$.

For insuring the parallelism of successive series of undulations on the return of the grain-drill along the ground there is attached against the frame $a$, preferably at its rear end, a slotted index-bar $v$, Figs. 1 and 2, which is adjustable in a vertical plane around a bolt $w$, projecting from the face of a bracket $x$, which is secured to the frame $a$, so that when the index-bar $v$ is lowered and the grain-drill is traveling a straight furrow is thereby formed along the ground, and serves as a guide for the insertion of the index-bar $v$ on the return of the grain-drill for the next series of undulating grain-deposits, and so on over the entire area to be sown.

For engaging the intermediate gear-wheel $y$ of the grain-hopper feed mechanism (see Figs. 1 and 5) with the driving-gear to wheel $z$ on the axle $b$, when the share-bars $f$ and drill-teeth $j$ are lowered by the hand-lever $m$, and vice versa, the axle of the wheel $y$ is mounted in a slotted bearing $a'$, and coupled by a link $b'$ with an arm or lever $c'$, fulcrumed on a spindle $d'$, which carries a second opposite arm or lever $e'$, having a cam-shaped edge, the arm or lever $c'$ being connected to the frame $a$ by a spring $f'$, which normally tends to maintain the gear-wheel $y$ out of engagement with the driving-wheel $z$.

Figure 5:
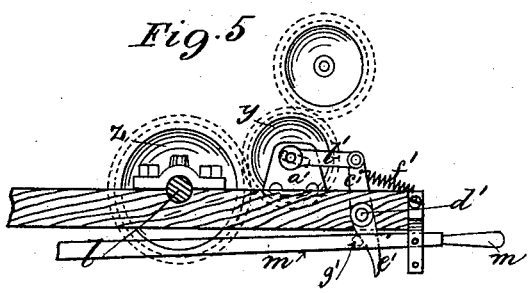

On raising the hand-lever $m$ into the position seen in Fig. 5 for lowering the drill-teeth $j$, a pin $g'$, which projects from the lever $m$, rides over the cam-shaped edge of the arm $e'$, and thereby throws over the latter with the arm $c'$, so as to move the gear-wheel $y$ into engagement with the driving-wheel $z$. On releasing or lowering the hand-lever $m$ for raising the drill-teeth $j$ from the ground, the levers $c'$ $e'$ are returned to their normal position, or so as to retract the wheel $y$ from the wheel $z$ by the spring $f''$.

By our invention the same quantity of grain is distributed over a larger area of ground and a better yield obtained therefrom than with the grain-drills in present use, as, owing to the tremor induced by the vibration of the drill-teeth, a thorough separation of the grain while being deposited is insured and its adhesion in irregular patches prevented.

We claim as our invention—

1. In a grain-drill, the combination of a sleeve adapted to slide longitudinally on the carriage-axle and coupled by pins to the drill-teeth bars, a bevel-wheel on the axle engaging in a bevel wheel or pinion pivoted axially to a lever fulcrumed to the frame, said bevel wheel or pinion having a crank-pin coupled by a rod to the sleeve, with means for operating the said lever, substantially as shown, and for the purpose described.

2. In a drill, the combination, with a series of drill-teeth, each having a bar-support which is pivoted on the frame and provided with a slot between the tooth and end of the bar, of a longitudinally-movable pin-support having pins which engage in the slots of the teeth-bars, and gearing for actuating the pin-support from the wheel, substantially as and for the purposes described.

3. In a grain-drill, the combination of drill-teeth having bars pivoted on the frame at their rear ends and slotted opposite the axle, and a shifting-sleeve arranged on the axle and provided with pins which engage in the slots of the teeth-bars, substantially as and for the purposes described.

4. In a grain-drill, the combination, with a series of drill-teeth, each tooth having a bar-support slotted at or near its mid-length, of an adjustable frame-bar on which the bar-supports are pivoted at one end, and a transversely-movable pin-support provided with pins which engage in the mid-length slots of the support-bars, substantially as and for the purposes described.

5. In a grain-drill, the combination, with a series of adjustable drill-teeth, of a lever for adjusting the same, said lever provided with a projecting pin, a rock-lever pivoted on the frame and having one arm arranged in the path of the pin on the first-named lever and its other arm connected by a link with a movable gear arranged to engage with the feed mechanism, and a spring to retract the rock-lever, substantially as and for the purposes described.

6. In a grain-drill, the combination, with a series of drill-teeth, each tooth having a bar-support slotted at or near its mid-length, of an adjustable frame-bar on which the bar-supports are pivoted at one end, a transversely-movable pin-support provided with pins which engage in the mid-length slots of the support-bars, and springs for holding said support-bars down, substantially as and for the purposes described.

In testimony whereof we have affixed our signatures, in presence of two witnesses, this 16th day of March, 1889.

CHARLES F. LAWRENCE.
MICHAEL RUECKERT.

Witnesses:
 PAUL BAKEWELL,
 S. L. SCHRADER.